United States Patent [19]

Aharon

[11] Patent Number: 4,902,084

[45] Date of Patent: Feb. 20, 1990

[54] OPTICAL SCANNING SYSTEM

[76] Inventor: Oren Aharon, Shikma 23rd, Romema, Haifa, Israel

[21] Appl. No.: 225,744

[22] Filed: Jul. 29, 1988

[51] Int. Cl.[4] .......................... G02B 26/10; G02B 5/00
[52] U.S. Cl. ......................................... 350/6.8; 350/319
[58] Field of Search .................. 350/6.5, 6.6, 6.7, 6.8, 350/319

[56] References Cited

U.S. PATENT DOCUMENTS

| 4,108,532 | 8/1978 | Minoura | 350/6.6 |
|---|---|---|---|
| 4,179,183 | 12/1979 | Tateoka et al. | 350/6.1 |
| 4,247,160 | 1/1981 | Brueggemann | 350/6.8 |
| 4,502,757 | 3/1985 | Maeda | 350/173 |
| 4,512,625 | 4/1985 | Brueggemann | 350/6.8 |
| 4,538,895 | 9/1985 | Higgins et al. | 350/6.8 |
| 4,571,035 | 2/1986 | Sakuma | 350/6.8 |
| 4,620,768 | 11/1986 | Tatsuno et al. | 350/6.8 |

FOREIGN PATENT DOCUMENTS

| 34750 | 3/1977 | Japan | 350/6.8 |
|---|---|---|---|
| 184901 | 10/1983 | Japan | 350/6.7 |
| 100707 | 5/1986 | Japan | 350/319 |
| 144621 | 7/1986 | Japan | 350/6.8 |
| 281214 | 12/1986 | Japan | 350/6.8 |

OTHER PUBLICATIONS

*Imaging with Laser Scanners*, Optic News, Nov., 1986, by Leo Beiser.

Primary Examiner—Bruce Y. Arnold
Assistant Examiner—Ronald M. Kachmarik
Attorney, Agent, or Firm—Pretty, Schroeder, Brueggemann & Clark

[57] ABSTRACT

An optical scanning apparatus and method that repeatedly scans a beam of light longitudinally along an outer photosensitive surface of a cylindrical drum, in synchronism with a rotation of the drum about is central longitudinal axis, whereby the beam traces a raster scan pattern on the surface. An aperture plate having an alongated aperture formed in it is positioned adjacent to the drum, with the aperture's axis oriented substantially parallel with the drum's axis. The aperture's width in a cross-scan direction, perpendicular to the longitudinal scan direction, is narrower than the cross-scan width of the scanning beam, such that the aperture transmits to the drum surface only a narrow portion of the beam. The location and the intensity of the portion of the beam transmitted through the aperture of the drum surface is substantially unaffected by a limited cross-scan deviation of the beam.

10 Claims, 2 Drawing Sheets

FIG. 3
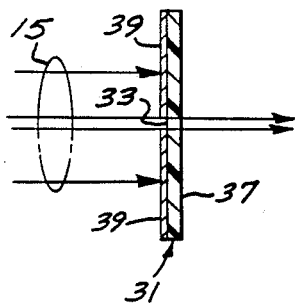
FIG. 4
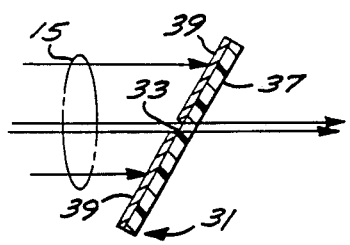
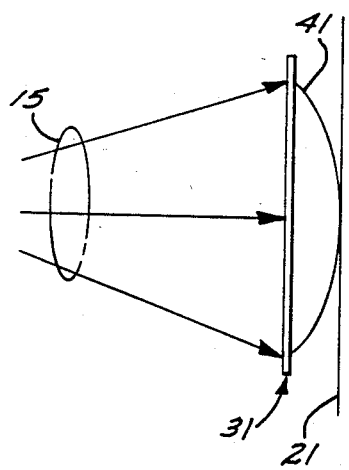
FIG. 5

OPTICAL SCANNING SYSTEM

BACKGROUND OF THE INVENTION

This invention relates generally to optical scanning systems, and, more particularly, to optical scanning systems that provide a raster scan of a collimated beam of light across a surface, as part of a system for reading and/or recording images.

Optical scanning systems of this particular kind are now in common use in numerous applications, including laser printing and xerography. In the case of laser printing, an intensity-modulated laser beam typically is made to scan repeatedly along the longitudinal axis of a cylindrical photoreceptive drum, in synchronism with a controlled rotation of the drum. This forms a raster-scan image on the drum, which can thereafter be transferred to paper.

The repeated longitudinal scanning of the laser beam on the photoreceptive drum is typically accomplished using a movable mirror such as a polygonal mirror assembly or a resonating galvanometric mirror. As soon as each scan has been completed, the next scan begins, by which time the drum will have been rotated a prescribed amount.

Imperfections in the movable mirror, such as a pyramidal misalignment of one or more mirrors of the polygonal mirror assembly, can cause the scanning beam of light to deviate transversely from its intended direction, in a cross-scan direction. A distorted, non-uniform raster scan image is thereby produced.

Efforts in the past to correct for cross-scan deviation errors of this kind have centered largely on improving the construction of the polygonal mirror assembly, itself, and on providing an additional lens system for redirecting the deviated beam back toward its desired point of impingement on the drum. Although these efforts have generally proven effective in providing a raster scan image of a desired precision and accuracy, the solutions are believed to have required undue expense and complexity.

It should, therefore, be appreciated that there still is a need for an improved optical scanning system that precisely aligns a scanning beam with a photosensitive drum, without requiring the use of a relatively expensive and complex lens structure. The present invention fulfills this need.

SUMMARY OF THE INVENTION

This invention is embodied in an optical scanning apparatus, and related method, for repeatedly scanning a collimated beam of light longitudinally along the outer photosensitive surface of a controllably rotatable cylindrical drum, without the need for a relatively expensive and complex optical lens structure to ensure a precise spacing between adjacent scans. In accordance with the invention, a proper alignment of the scanning beam on the surface is achieved using aperture means that defines an elongated aperture closely spaced to the surface and arranged with its longitudinal axis substantially parallel with that of the surface. The width of the aperture in a cross-scan direction, perpendicular to the scanning direction, is substantially narrower than the width of the beam, whereby the beam direction can deviate substantially from its desired direction yet the intensity and location of the portion of the beam transmitted to the surface remains substantially the same. This eliminates the need for a precisely-manufactured rotatable mirror assembly or for additional optics for correcting the beam's direction.

In another aspect of the invention, the aperture means includes a flat plate that can be controllably rotated about the axis of the elongated aperture, to narrow the aperture's effective width and thereby control the apparatus's scanning precision. A selectable image resolution is thereby provided. In one form of the invention, the plate is transparent and includes an opaque coating deposited on one of its surfaces, with a narrow slit being formed in the coating to define the elongated aperture. Alternatively, the plate is opaque, and the aperture is defined by an elongated slot extending completely through the plate.

Other features and advantages of the present invention should become apparent from the following description of the preferred embodiment, taken in conjunction with the accompanying drawings, which illustrate, by way of example, the principles of the invention.

BRIEF DESCRIPTION OF THE DRAWINGS

FIG. 3 is an end elevational view of the aperture plate and drum portion of the apparatus of FIG. 2, showing how only a narrow portion of the impinging beam is transmitted by the aperture plate to the drum.

FIG. 4 is an end elevational view similar to FIG. 3, but with the aperture plate rotated about the axis of the aperture so as to transmit a narrower beam to the drum.

FIG. 5 is a schematic plan view of the aperture plate and drum, showing in exaggerated form the relationship between the curved locus of focal points for the scanning beam and the straight locus of the beam's point of impingement on the drum.

DESCRIPTION OF THE PREFERRED EMBODIMENT

Figure 2:
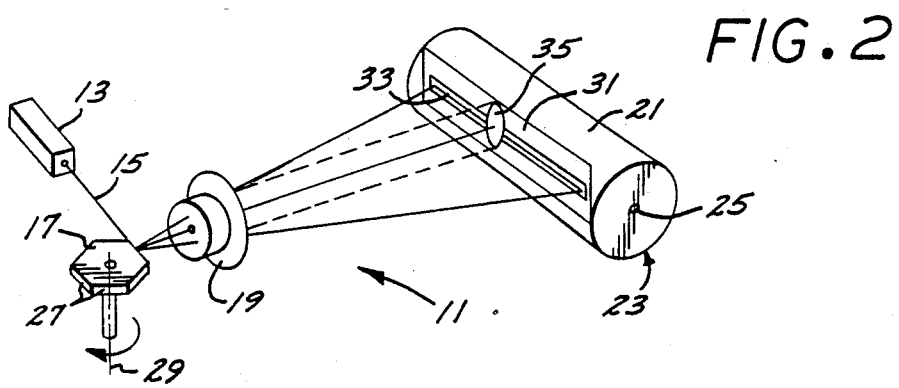
FIG. 2 is a perspective view, similar to FIG. 1, but of one preferred embodiment of an optical scanning apparatus in accordance with the invention, the apparatus including a plate defining an elongated aperture that corrects for any cross-scan deviation in the scanning beam.

With reference now to the drawings, and particularly to FIG. 2, there is shown an optical scanning apparatus 11 for use in a laser printer (not shown). A laser and intensity modulator 13 provide a collimated, intensity-modulated beam of light 15 that is redirected by a rotating polygonal mirror assembly 17 through an objective lens 19 to repeatedly scan longitudinally along the surface 21 of a cylindrical drum 23. The drum rotates slowly about its longitudinal axis 25, at a rate synchronized with the repetitive scanning provided by the mirror assembly, such that the beam traces a raster scan pattern on the drum surface. The drum surface includes a photoreceptive coating such that the intensity-modulated beam records a two-dimensional image on the surface. After the scanning has been completed, the recorded image can be transferred to a paper medium, in a conventional process.

The rotating polygonal mirror assembly 17 includes a plurality of equal-sized, planar mirror facets 27 spaced uniformly around a central axis 29. The facets all face radially outwardly, with their planes substantially parallel with the central axis. The intensity-modulated beam 15 produced by the laser/modulator 13 is directed at the mirror assembly such that rotation of the assembly about its central axis brings each of the facets successively into the beam's path. The beam is thereby reflected through the lens 19 toward the drum 23.

It is generally difficult to manufacture the polygonal mirror assembly 17 in such a fashion that all of its individual mirror facets 27 are precisely flat and aligned with their planes precisely parallel with the assembly's rotation axis 29. Unless substantial manufacturing expense is incurred, individual facets frequently are tilted slightly relative to the rotation axis. This has the effect of deviating the scanning beam in a cross-scan direction, perpendicular to the longitudinal direction of the scan on the drum surface 21. The spacing between adjacent scans on the surface is therefore not uniform, and a distorted image will result.

Figure 1:
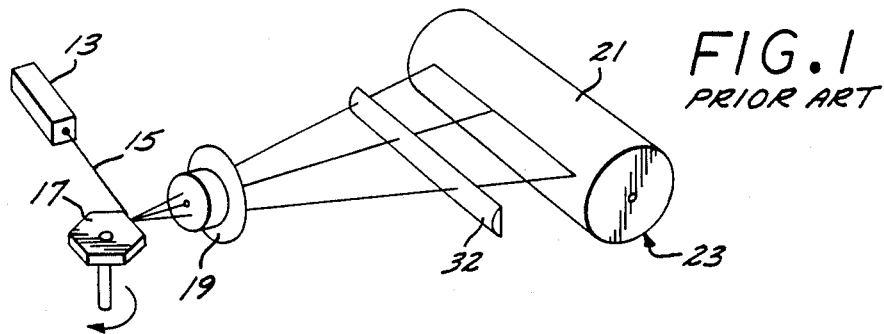
FIG. 1 is a perspective view, in simplified form, of a typical optical scanning apparatus of the prior art, with a cylindrical lens to correct for a cross-scan deviation of the scanning beam.

This problem has been addressed in the past by inserting one or more additional correcting lenses into the path of the scanning beam 15. FIG. 1 depicts one prior art apparatus of this kind, which includes an anamorphic, cylindrical lens 32 positioned between the objective lens 19 and the rotating cylindrical drum 23. If the beam ever deviates in a cross-scan direction from its desired path, the cylindrical lens redirects the beam back such that it impinges on the drum at or close to its desired scan line. This solution has not proven to be entirely satisfactory, however, because a residual cross-scan error usually remains and because it increases the apparatus' expense and complexity.

In accordance with the invention, the undesired image distortion caused by a cross-scan deviation of the scanning beam 15 is corrected for using an aperture plate 31 positioned in front of the rotating drum 23, with an elongated aperture 33 in the plate transmitting to the drum surface 21 only a narrow portion of the scanning beam. As depicted in exaggerated form in FIG. 2, the beam impinges on the plate in an elongated, elliptical spot 35 that encompasses the aperture. The spot preferably is oriented with its long elliptical axis generally perpendicular to the aperture. Only a small portion of the beam, i.e., the portion actually impinging on the aperture, is transmitted through the plate to impinge on the drum surface. It will appreciated that even if the beam direction deviates substantially in the cross-scan direction, a portion of the beam still will impinge on the aperture and, therefore, be transmitted to the drum. Thus, rather than correcting for the deviation in the beam's direction, the apparatus accepts the deviation and merely selects a different portion of the beam for impingement on the drum.

The scanning beam 15 directed at the aperture plate 31 preferably has an intensity profile, in the cross-scan direction, that is substantially uniform over the distance of the expected cross-scan deviation. Consequently, as the beam deviates in the cross-scan direction from its desired orientation, the peak intensity of the portion of the beam impinging directly on the aperture 33, and therefore transmitted to the drum surface 21, will remain substantially unchanged. This ensures that the recording of an image in the drum surface is uniform over its entire area.

Most of the intensity-modulated beam 15 will impinge on the plate 31 and not be transmitted through the aperture 33. Consequently, the beam's power level must be substantially higher than in prior apparatus of this kind, for the same power to actually impinge on the drum surface 21. This is ordinarily not a problem, because adequate power levels can be achieved using standard commercially available laser diodes.

It will appreciated that the optical scanning apparatus of the invention could alternatively include a conventional resonating galvanometric mirror in place of the mirror assembly 17. The lens 19 also can be replaced by other lens structures or eliminated altogether. Such modified apparatus are similarly subject to cross-scan deviations of the scanning beam, which are corrected for as described above.

The aperture plate 31 is preferably positioned as closely as possible to the drum surface 21, to reduce diffraction effects. The plate can be formed using any of several different conventional processes. For example, as shown in FIGS. 3 and 4, the plate can include a transparent substrate 37 with an opaque coating 39 on one surface. The elongated aperture 33, which typically has a uniform width of about three mils, is formed in the opaque coating using standard photographic techniques. Alternatively, the plate can be formed of metal and the aperture can be a chemically etched or machined slot extending completely through it.

Some applications of scanning apparatus of this kind call for a selectable image resolution. This requires that the spacing between adjacent scans, as well as the width of each scan, be controllably selectable. The width of each scan can easily be selected using the apparatus of the invention by simply rotating the aperture plate 31 about the axis of the elongated aperture 33, as shown in FIGS. 3 and 4. This narrows the aperture's width in the cross-scan direction and thereby narrows the cross-scan width of the portion of the beam 15 transmitted to the rotating drum 23.

FIG. 5 is a schematic plan view of the aperture plate 31 and the drum 23, showing in exaggerated form how the focal point of the scanning intensity-modulated beam 15 forms an arc 41 centered generally at the lens 19. This arc is located generally in the region of the plate and the drum. Thus, the beam will be somewhat unfocused when it reaches the drum surface 21 at the beginning and ending of each scan.

The unfocusing of the beam 15 described above does not raise a significant problem in the cross-scan direction, because the aperture 33 effectively limits the size of the spot of impingement in that direction. In the longitudinal scan direction, however, the unfocusing of the beam does raise a problem. This is because a leading edge of the beam will reach a given point in the scan before the center of the beam reaches it and the trailing edge of the beam will not leave that point until after the beam center leaves it. This phenomenon can be conveniently corrected for electronically by appropriately delaying the switching on of the beam by the intensity modulator 13 and advancing the switching off of the beam at the beginning and ending of each scan. In most circumstances, this effectively corrects for the unfocusing phenomenon.

It should be appreciated from the foregoing description that the present invention provides an improved optical scanning apparatus and method, in which a light beam is made to repeatedly scan longitudinally along the surface of a cylindrical drum, in synchronism with rotation of the drum. A proper alignment of the scanning beam is achieved using aperture means that defines an elongated aperture closely spaced to the drum surface and arranged with is axis parallel with the drum axis. The aperture's width is substantially narrower than the beam's width in the cross-scan direction, whereby the apparatus' optics can allow the beam to deviate substantially from its desired direction yet the intensity and location of the portion of the beam transmitted to the drum surface remains substantially the same.

Although the invention has been described in detail with reference to the presently preferred embodiment, those skilled in the art will appreciate that various modifications can be made without departing from the invention. Accordingly, the invention is defined only by the following claims and equivalents thereof.

I claim:

1. Optical scanning apparatus comprising:
   source means for providing a collimated beam of light;
   a drum including a photosensitive cylindrical surface with a central longitudinal axis and further including means for controllably rotating the cylindrical surface about its longitudinal axis;
   scanning means for repeatedly scanning the collimated beam of light longitudinally along the cylindrical surface of the drum, in synchronism with rotation of the surface about its longitudinal axis; and
   aperture means defining an elongated aperture of substantially uniform width, oriented adjacent to and substantially parallel with the longitudinal axis of the cylindrical surface, for transmitting the collimated beam of light from the scanning means to the cylindrical surface, while limiting the width of the beam in a cross-scan direction, perpendicular to the scan direction, to a predetermined maximum amount;
   wherein the aperture means is controllably rotatable about the axis of the elongated aperture, to controllably adjust the width of the aperture in the cross-scan direction and thereby controllably adjust the width of the portion of the beam of light transmitted to the cylindrical surface.

2. Optical scanning apparatus as defined in claim 1, wherein:
   the width of the beam of light at its point of impingement on the aperture means is substantially greater than the width of the aperture, in the cross-scan direction;
   imperfections in the scanning means cause the scanning beam of light to deviate in the cross-scan direction from its desired longitudinal scan direction, the deviation being less than the width of the beam at is point of impingement on the aperture means; and
   the intensity of the portion of the beam of light transmitted to the cylindrical surface by the aperture means remains substantially unaffected by the beam's cross-scan deviations.

3. Optical scanning apparatus as defined in claim 1, wherein the aperture means includes:
   a flat, transparent substrate; and
   an opaque coating deposited on one surface of the substrate, a narrow slit being formed in the coating to define the elongated aperture.

4. Optical scanning apparatus as defined in claim 1, wherein the aperture means includes:
   a flat, opaque plate; and
   means defining an elongated slot extending completely through the plate to constitute the aperture.

5. Optical scanning apparatus as defined in claim 1, wherein:
   the source means includes a laser and means for modulating the intensity of a beam of light generated by the laser;
   the scanning means includes a rotatable mirror assembly and an associated lens for imaging the beam of light at or near the cylindrical surface of the drum; and
   the cylindrical surface of the drum is responsive to variations in the intensity of the beam of light such that the scanning beam forms an image on the surface in accordance with the beam's modulated intensity, such image being transferrable to a separate recording medium.

6. Laser scanning apparatus comprising:
   laser means for providing a collimated beam of light;
   a cylindrical drum having a photosensitive outer surface and a central longitudinal axis;
   means for controllably rotating the cylindrical drum about its longitudinal axis;
   rotating mirror means for reflecting and repeatedly scanning the collimated beam of light longitudinally along the drum surface, in synchronism with rotation of the drum about its longitudinal axis, such that the beam of light traces a raster scan pattern on the surface;
   an aperture plate positioned immediately adjacent the cylindrical drum, in the path of the scanning beam of light, the plate including means defining an elongated aperture oriented substantially parallel with the longitudinal axis of the cylindrical drum, the aperture having a substantially uniform width in a cross-scan direction, perpendicular to the scan direction, that is narrower than the cross-scan width of the scanning beam, such that the aperture transmits to the drum surface only a limited portion of the scanning beam;
   wherein imperfections in the rotating mirror means causes the scanning beam of light to deviate in the cross-scan direction from its desired longitudinal scan direction, the deviation being less than the width of the beam at its point of impingement on the aperture plate;
   wherein the intensity profile of the beam of light is sufficiently uniform that the intensity of the portion of the beam transmitted through the aperture to the drum surface is substantially unaffected by the deviation; and
   wherein the aperture plate is controllably rotatable about the axis of the elongated aperture, to adjust the width of the aperture in the cross-scan direction and thereby adjust the cross-scan width of the portion of the beam of light transmitted to the drum surface.

7. Laser scanning apparatus as defined in claim 6, wherein the aperture plate includes a flat, transparent substrate and an opaque coating deposited on one surface of the substrate, the aperture being defined by a narrow slit formed in the coating.

8. Laser scanning apparatus as defined in claim 6, wherein the aperture plate includes a flat, opaque plate and the aperture is defined by an elongated slot extending completely through the plate.

9. A method for repeatedly scanning a beam of light longitudinally along an outer photosensitive surface of a cylindrical drum, the method comprising steps of:
   providing a collimated beam of light;

controllably rotating the cylindrical drum about a central longitudinal axis;

repeatedly scanning the beam of light longitudinally along the outer photosensitive surface of the cylindrical drum, in synchronism with rotation of the drum about is longitudinal axis;

limiting the width of the scanning beam of light in a direction perpendicular to the longitudinal scanning direction using an aperture plate positioned adjacent to the surface of the cylindrical drum, in the path of the beam, the plate including an elongated, narrow aperture oriented substantially parallel with the drum's longitudinal axis and having a width less than the width of the beam in the cross-scan direction; and controllably rotating the aperture plate about the axis of the elongated aperture, to adjust the width of the aperture in the cross-scan direction and thereby adjust the cross-scan width of the portion of the beam of light transmitted to the drum surface.

10. A method as defined in claim 9, wherein:

disturbances occurring in the step of repeatedly scanning cause the scanning beam of light to deviate transversely from the beam's desired longitudinal scan direction, the deviation being less than the width of the beam at is point of impingement on the plate; and the intensity profile of the beam of light is sufficiently uniform such that the intensity of the portion of the beam transmitted through the aperture to the drum surface is substantially unaffected by the deviation.

* * * * *